(12) United States Patent
Lee

(10) Patent No.: US 12,743,001 B2
(45) Date of Patent: Sep. 22, 2026

(54) IRIS MODULE AND CAMERA MODULE INCLUDING THE SAME

(71) Applicant: SAMSUNG ELECTRO-MECHANICS CO., LTD., Suwon-si (KR)

(72) Inventor: Sunghae Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 174 days.

(21) Appl. No.: 18/667,462

(22) Filed: May 17, 2024

(65) Prior Publication Data

US 2024/0419055 A1 Dec. 19, 2024

(30) Foreign Application Priority Data

Jun. 13, 2023 (KR) ........................ 10-2023-0075701

(51) Int. Cl.
*G03B 9/06* (2021.01)
*G03B 17/12* (2021.01)

(52) U.S. Cl.
CPC ............... *G03B 9/06* (2013.01); *G03B 17/12* (2013.01)

(58) Field of Classification Search
CPC .. G03B 17/12; G03B 9/06; G03B 2205/0069; G03B 17/02
See application file for complete search history.

(56) References Cited

U.S. PATENT DOCUMENTS 10,571,648 B2 * 2/2020 Lee ........................ G03B 7/095
2016/0025995 A1 1/2016 Ariji
2019/0141219 A1 5/2019 Oh et al.
2019/0377238 A1 12/2019 Kim et al.
2019/0377239 A1 * 12/2019 Lee .......................... G03B 9/06
2020/0012170 A1 1/2020 Hong et al.
2020/0301246 A1 9/2020 Seo et al.
2022/0128832 A1 4/2022 Hwang et al.

FOREIGN PATENT DOCUMENTS

KR 10-2019-0053037 A 5/2019
KR 10-2006946 B1 8/2019
KR 10-2019-0139657 A 12/2019
KR 10-2020-0004513 A 1/2020
KR 10-2297281 B1 9/2021
KR 10-2022-0055298 A 5/2022
KR 10-2022-0107482 A 8/2022

OTHER PUBLICATIONS

Korean Office Action Issued on Jul. 22, 2025, in Counterpart Korean Patent Application No. 10-2023-0075701 (5 Pages in English, 5 Pages in Korean).
Korean Notice of Allowance issued on Apr. 27, 2026, in counterpart Korean Patent Application No. 10-2023-0075701 (2 pages in English, 3 pages in Korean).

* cited by examiner

*Primary Examiner* — Christopher E Mahoney
(74) *Attorney, Agent, or Firm* — NSIP Law

(57) ABSTRACT

An iris module includes an iris main body including a base and a holder guide portion extending from a side surface of the base, a magnet holder seated on the holder guide portion and including an iris magnet, and a magnet holder coupling portion that couples the magnet holder to the holder guide portion. The magnet holder coupling portion includes a protrusion protruding from a side surface of the magnet holder, and a fastening portion formed at the holder guide portion and fastened to the protrusion.

17 Claims, 12 Drawing Sheets

IRIS MODULE AND CAMERA MODULE INCLUDING THE SAME

CROSS-REFERENCE TO RELATED APPLICATIONS

This application claims the benefit under 35 USC 119(a) of Korean Patent Application No. 10-2023-0075701 filed on Jun. 13, 2023, in the Korean Intellectual Property Office, the entire disclosure of which is incorporated herein by reference for all purposes.

BACKGROUND

1. Field

The present disclosure relates to an iris module and a camera module including the same.

2. Description of the Background

Camera modules may be installed in portable electronic devices such as smart phones, tablet PCs, laptops, or the like. As competition for product differentiation in the portable electronic devices intensifies, cases of applying a function of a general digital camera to the cameras of the portable electronic devices are increasing. A demand for obtaining a bokeh effect or a bright and clear picture by controlling an amount of light through a variable iris has also increased.

The general digital camera may include a mechanical iris to be driven to change an amount of light incident dependent on a photographic environment. However, in the case of the camera module applied to a small device such as a portable electronic device, it may be difficult to apply the mechanical iris due to its structural characteristic and spatial limitation.

When an iris module applied to the camera module is applied to a large-diameter model, an amount of impact applied to an iris magnet holder may increase due to an increase in a weight of an iris driver. Additionally, as an entire length of the iris module increases when the iris module is applied to the large-diameter model, a length from a point of support of an external force to a point of application of the external force may increase so that an amount of force generated increases. Therefore, when an external impact is applied to the iris module, a degree of deformation and a degree of damage of the iris module and the camera module including the iris module may increase.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an iris module includes an iris main body including a base and a holder guide portion extending from a side surface of the base, a magnet holder seated on the holder guide portion and including an iris magnet, and a magnet holder coupling portion that couples the magnet holder to the holder guide portion. The magnet holder coupling portion includes a protrusion protruding from a side surface of the magnet holder, and a fastening portion formed at the holder guide portion and fastened to the protrusion.

The holder guide portion may include a guide main body having a quadrangular frame shape and an edge portion protruding from an edge of the guide main body to guide reciprocal movement of the magnet holder, and the fastening portion may include a fastening groove formed at the edge portion that corresponds to the protrusion.

The magnet holder coupling portion may further include a first auxiliary fastening portion extending from a lower surface of the magnet holder inserted into a first fastening hole formed at the edge portion.

The holder guide portion may include a guide main body having a quadrangular frame shape and an edge portion protruding from an edge of the guide main body to guide reciprocal movement of the magnet holder, and the fastening portion may include a bent portion formed at the edge portion that corresponds to the protrusion.

The bent portion may include a first branch portion extending parallel to a protruding direction of the protrusion, a second branch portion extending by being bent at an end portion of the first branch portion, and a third branch portion bent at an end portion of the second branch portion to extend parallel to the first branch portion, and the protrusion may be surrounded by the first branch portion, the second branch portion, and the third branch portion.

The second branch portion may face an end portion of the protrusion.

The magnet holder coupling portion may further include a second auxiliary fastening portion extending parallel to the second branch portion from the protrusion inserted into a second fastening hole formed at the third branch portion.

In another general aspect, a camera module includes a housing having an internal space, a lens barrel accommodated in the internal space of the housing and including a plurality of lenses, and an iris module disposed adjacent to the lens barrel and configured to adjust a size of an incident hole. The iris module includes an iris main body including a base and a holder guide portion extending from the base, a magnet holder seated on the holder guide portion and including an iris magnet, and a magnet holder coupling portion configured to reduce an impact by coupling the magnet holder to the holder guide portion, wherein the magnet holder coupling portion includes a protrusion protruding from a side surface of the magnet holder and a fastening portion formed at the holder guide portion and fastened to the protrusion.

The holder guide portion may include a guide main body and an edge portion disposed at an edge of the guide main body, and the fastening portion may include a fastening groove formed at the edge portion that corresponds to the protrusion.

The magnet holder coupling portion may further include a first auxiliary fastening portion extending from a lower surface of the magnet holder inserted into a first fastening hole formed at the edge portion.

The holder guide portion may include a guide main body having a quadrangular frame shape and an edge portion protruding from an edge of the guide main body to guide reciprocal movement of the magnet holder, and the fastening portion may include a bent portion formed at the edge portion that corresponds to the protrusion.

The bent portion may include a first branch portion extending parallel to a protruding direction of the protrusion, a second branch portion extending by being bent at an end portion of the first branch portion, and a third branch portion bent at an end portion of the second branch portion to extend parallel to the first branch portion, and the protrusion may be surrounded by the first branch portion, the second branch portion, and the third branch portion.

The second branch portion may face an end portion of the protrusion.

The magnet holder coupling portion may further include a second auxiliary fastening portion extending parallel to the second branch portion from the protrusion inserted into a second fastening hole formed at the third branch portion.

The camera module may further include a lens driving module configured to drive the lens barrel. The lens driving module may include an auto focus portion including a focus carrier accommodating the lens barrel, and a focus driving portion configured to generate a driving force to move the focus carrier in an optical axis direction, and an optical image stabilization portion including a correction carrier configured to guide movement of the lens barrel, and a correction driving portion configured to generate a driving force to move the correction carrier in a direction perpendicular to the optical axis direction, wherein the correction carrier may be disposed inside the focus carrier.

The housing may include a housing main body including four sidewalls connected to each other to form the internal space, the iris module may further include an iris driving portion configured to provide a driving force to adjust the size of the incident hole, the iris driving portion may include an iris magnet and an iris coil that face each other and provide a magnetic force, and the iris coil of the iris driving portion may be installed at any one of the four sidewalls of the housing main body.

The focus driving portion may be installed at another one of the four sidewalls, and the correction driving portion may be installed at the remaining two of the four sidewalls.

Other features and aspects will be apparent from the following detailed description, the drawings, and the claims.

Figure 1:
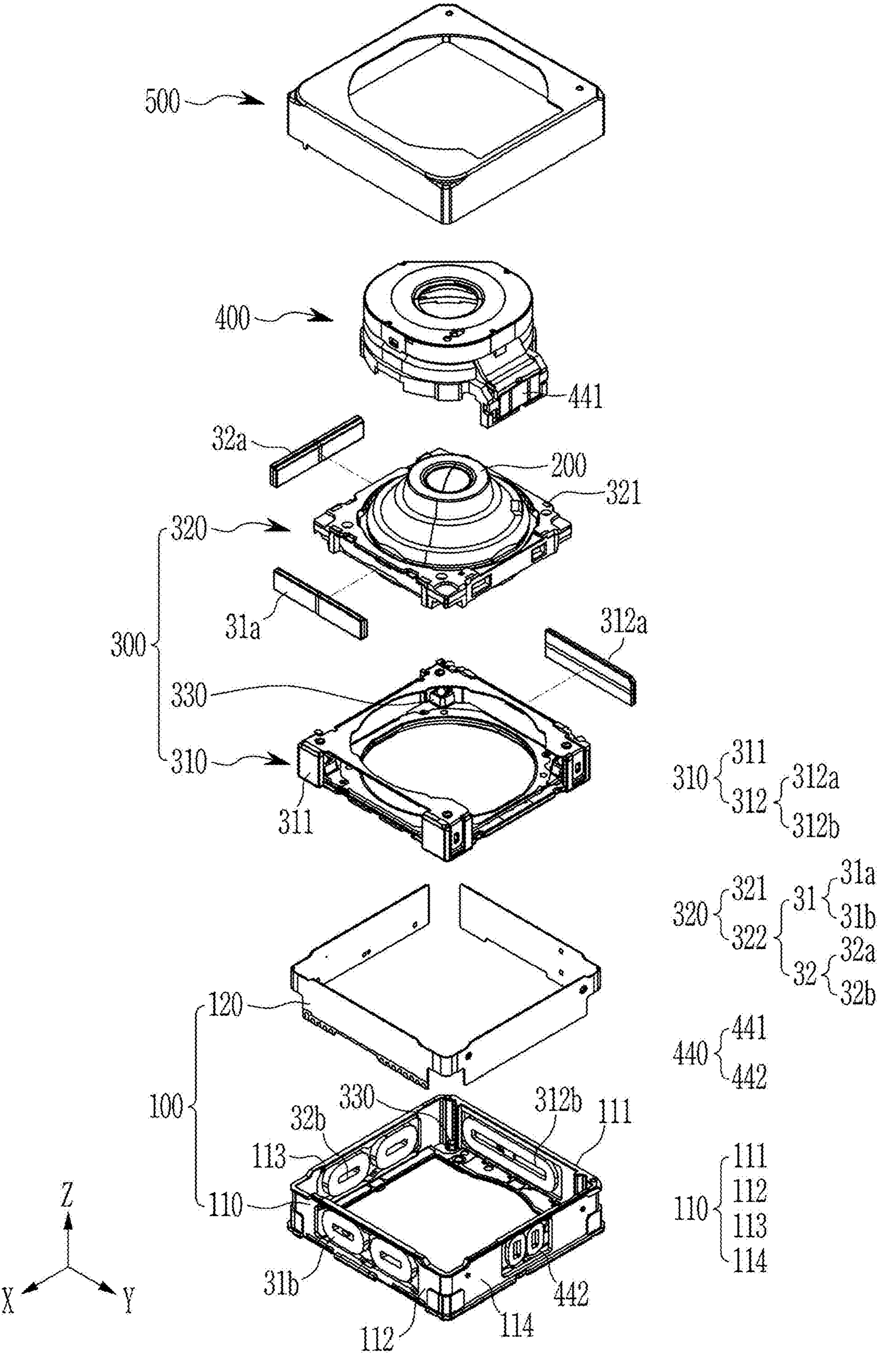
FIG. 1 is an exploded perspective view of a camera module according to an embodiment.

Throughout the drawings and the detailed description, unless otherwise described, the same reference numerals refer to the same elements. The drawings may not be to scale, and the relative size, proportions, and depiction of elements in the drawings may be exaggerated for clarity, illustration, and convenience.

DETAILED DESCRIPTION OF THE EMBODIMENTS

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

Embodiments are to provide an iris module that may secure reliability by mitigating an external impact to minimize a degree of deformation and a degree of damage, and are to provide a camera module including the same.

However, problems to be solved by the embodiments are not limited to the above-described problem and may be variously extended in a range of technical ideas included in the embodiments.

FIG. 1 is an exploded perspective view of a camera module according to an embodiment.

As shown in FIG. 1, the camera module according to the embodiment includes a housing 100, a lens barrel 200, a lens driving module 300, an iris module 400, and a cover 500.

The housing 100 may include a housing main body 110 whose upper and lower portions are open to have an internal space, and a circuit board (or a circuit substrate) 120 disposed to cover a side surface of the housing main body 110. The housing main body 110 may include four sidewalls connected to each other to form the internal space. The four sidewalls may include a first sidewall 111 and a second sidewall 112 facing each other, and a third sidewall 113 and a fourth sidewall 114 connecting the first sidewall 111 and the second sidewall 112 and facing each other.

The lens barrel 200, the lens driving module 300, and the iris module 400 may be accommodated in the internal space of the housing 100. An image sensor unit (or an image sensor portion) (not shown) including an image sensor that converts incident light to an electrical signal may be disposed at a lower portion of the housing 100.

The lens barrel 200 may have a hollow cylinder shape so that a plurality of lenses for capturing an image of a subject are accommodated therein. The plurality of lenses are mounted in the lens barrel 200 along an optical axis. The plurality of lenses may be disposed as many as necessary according to design of the lens barrel 200, and each lens may have an optical characteristic such as the same or different refractive indexes or the like.

The lens driving module 300 may be a device that moves the lens barrel 200, and may include an auto focus (AF) portion 310 that adjusts focus, an optical image stabilization (OIS) portion 320 that corrects hand shake, and a rolling member 330.

The auto focus (AF) portion 310 may adjust focus or may implement a zoom function by moving the lens barrel 200 in an optical axis direction Z.

The auto focus (AF) portion 310 includes a focus carrier 311 that accommodates the lens barrel 200, and a focus driving portion 312 that generates a driving force to move the lens barrel 200 and the focus carrier 311 in the optical axis direction Z. The focus driving portion 312 may include a focus driving magnet 312*a* mounted on one side surface of the focus carrier 311, and a focus driving coil 312*b* mounted on the first sidewall 111 of the housing main body 110 and connected to the circuit board 120. The focus driving coil 312*b* may be installed at the first sidewall 111 of the housing main body 110 to face the focus driving magnet 312*a*.

The optical image stabilization (OIS) portion 320 may correct hand shake during photographing by moving the lens barrel 200 in a direction X or Y perpendicular to the optical axis direction Z.

The optical image stabilization (OIS) portion 320 may include a correction carrier 321 that guides movement of the lens barrel 200, and a correction driving portion 322 that generates a driving force to move the correction carrier 321 in the direction X or Y perpendicular to the optical axis direction Z.

The correction carrier 321 may be accommodated in the focus carrier 311 to be aligned along the optical axis direction Z, and may guide movement of the lens barrel 200. The correction carrier 321 may have a central opening into which the lens barrel 200 may be inserted.

The correction driving portion 322 may include a first correction driving portion 31 including a first correction driving magnet 31*a* and a first correction driving coil 31*b*, and a second correction driving portion 32 including a second correction driving magnet 32*a* and a second correction driving coil 32*b*. The first correction driving magnet 31*a* and the second correction driving magnet 32*a* may be mounted on the correction carrier 321, and the first correction driving coil 31*b* and the second correction driving coil 32*b* facing the first correction driving magnet 31*a* and the second correction driving magnet 32*a*, respectively, may be fixedly mounted on the second sidewall 112 and the third sidewall 113 of the housing main body 110 via the circuit board 120, respectively. The first correction driving portion 31 may generate a driving force in the first direction X perpendicular to the optical axis direction Z, and the second correction driving portion 32 may generate a driving force in the second direction Y perpendicular to the optical axis direction Z and the first direction.

The rolling member 330 may have a ball shape, and may be installed between the focus carrier 311 and the housing 100 to reduce friction between the focus carrier 311 and the housing 100 when the focus carrier 311 moves in the optical axis direction Z. Additionally, the rolling member 330 may be installed between the focus carrier 311 and the correction carrier 321 to reduce friction between the correction carrier 321 and the correction driving portion 322.

The cover 500 may be coupled to the housing 100 to surround an outer surface of the housing 100. The cover 500 may protect the lens barrel 200, the lens driving module 300, and the iris module 400 disposed in the internal space of the housing 100 from external physical impact, or may shield electromagnetic wave.

The iris module 400 may selectively change an amount of light incident on the lens barrel 200. The iris module 400 may be disposed at an upper end of the lens driving module 300, and may be disposed in front of the lens driving module 300 based on a light incident direction. The iris module 400 may be combined with the lens driving module 300 to move in the optical axis direction Z, the first direction X, and the second direction Y together with the lens driving module 300. The iris module 400 may allow a relatively small amount of light to enter the lens barrel 200 in a high illumination environment and may allow a relatively large amount of light to enter the lens barrel 200 in a low illumination environment, so that image quality is consistently maintained even under various illumination conditions.

Hereinafter, the iris module will be described in detail with reference to FIGS. 2 to 5.

Figure 2:
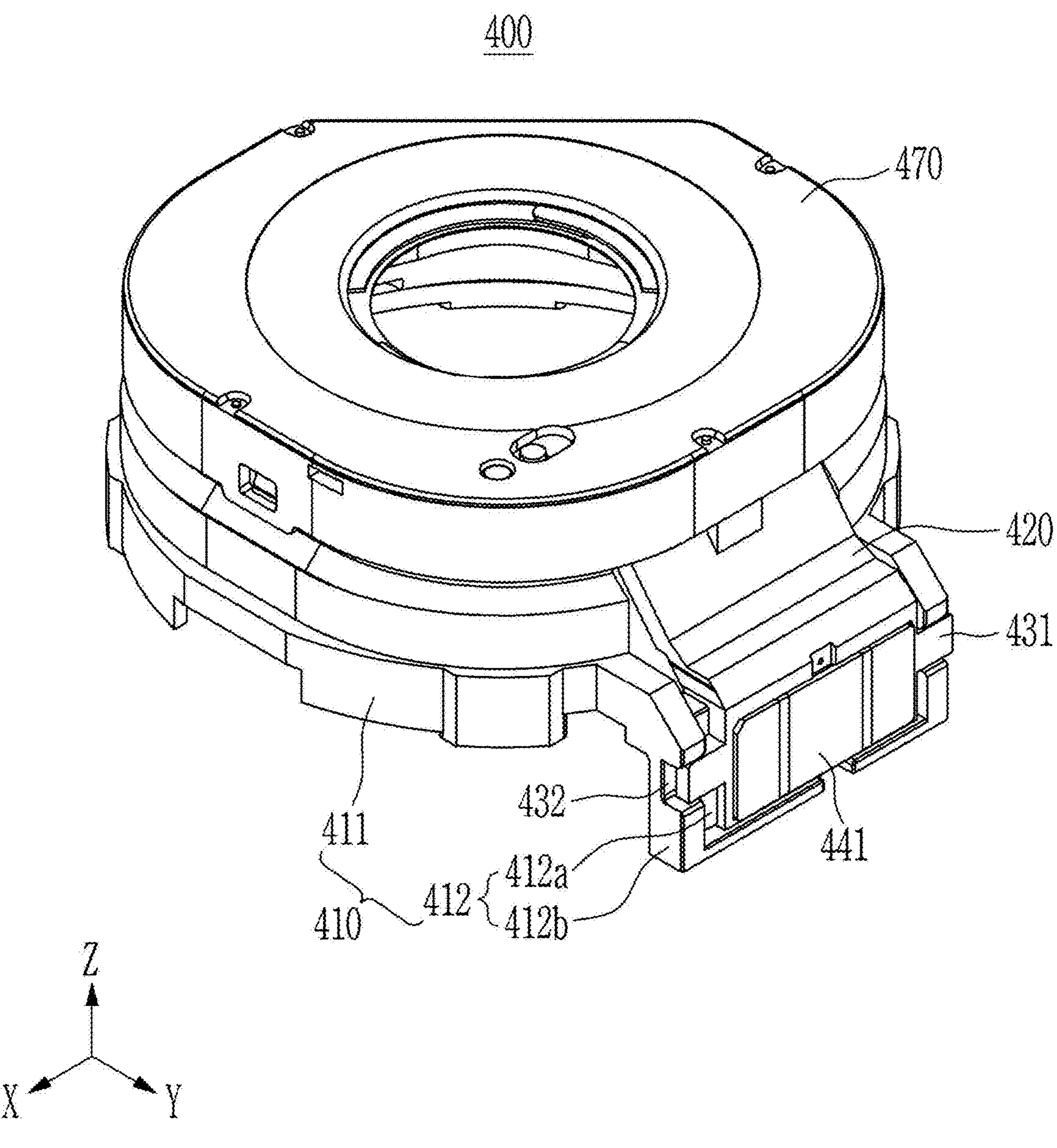
FIG. 2 is a perspective view of an iris module of FIG. 1.
Figure 3:
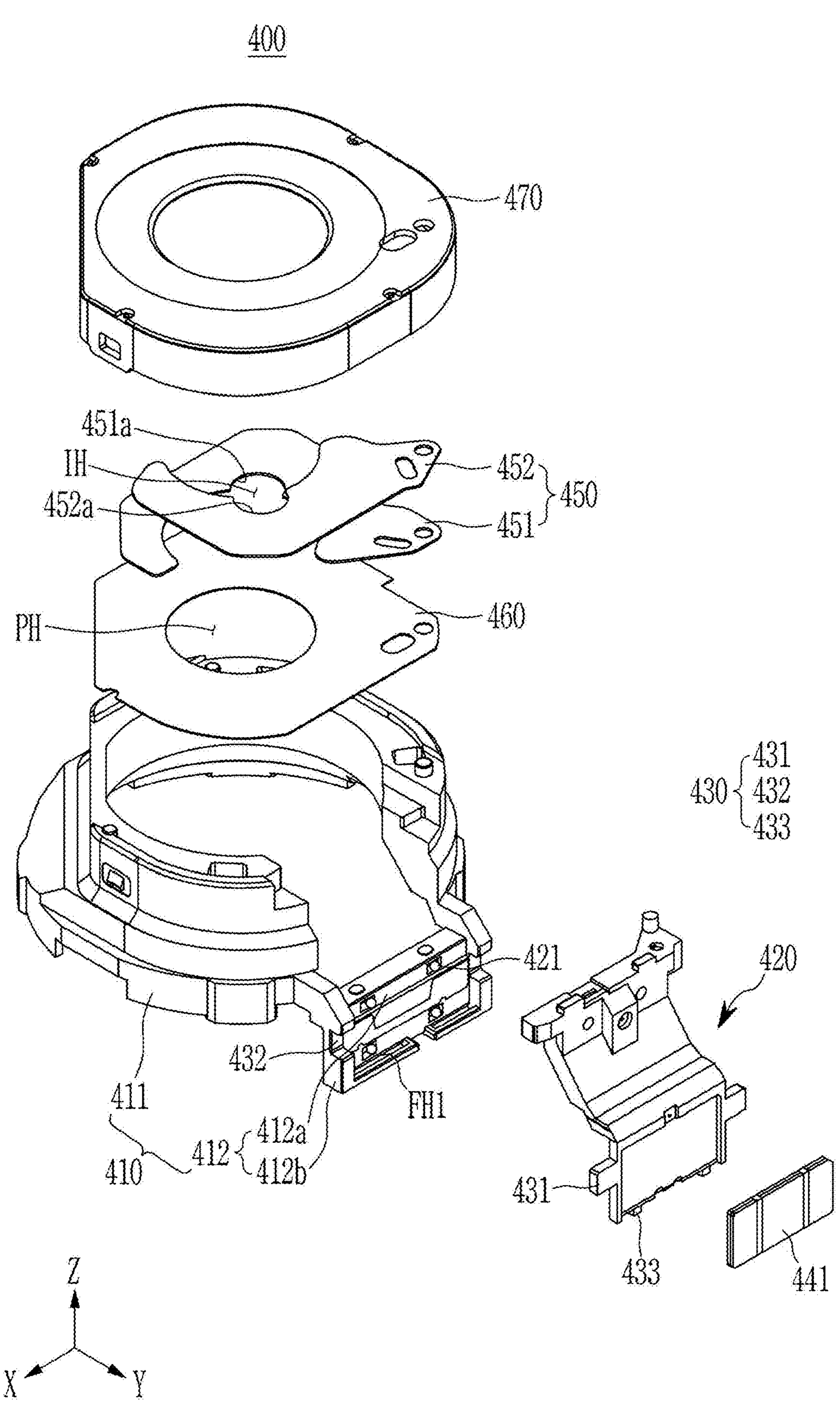
FIG. 3 is an exploded perspective view of FIG. 2.
Figure 4:
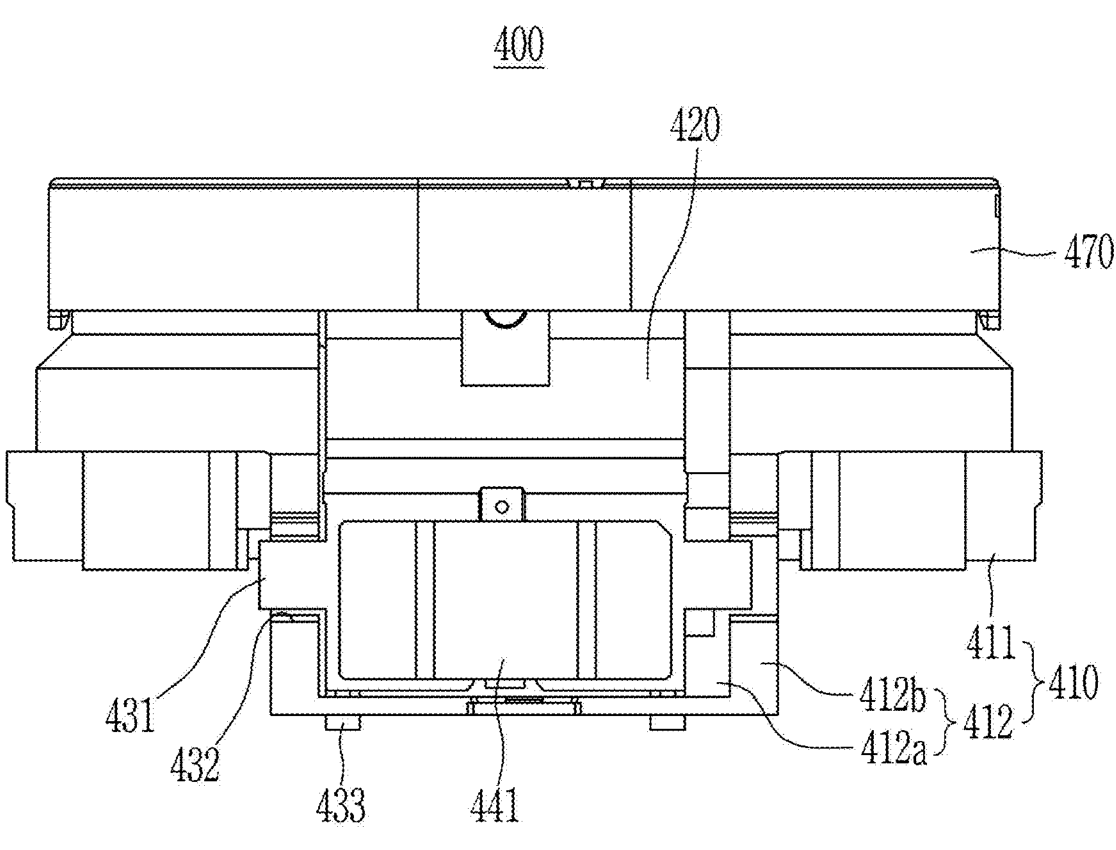
FIG. 4 is a front view of FIG. 2.
Figure 5:
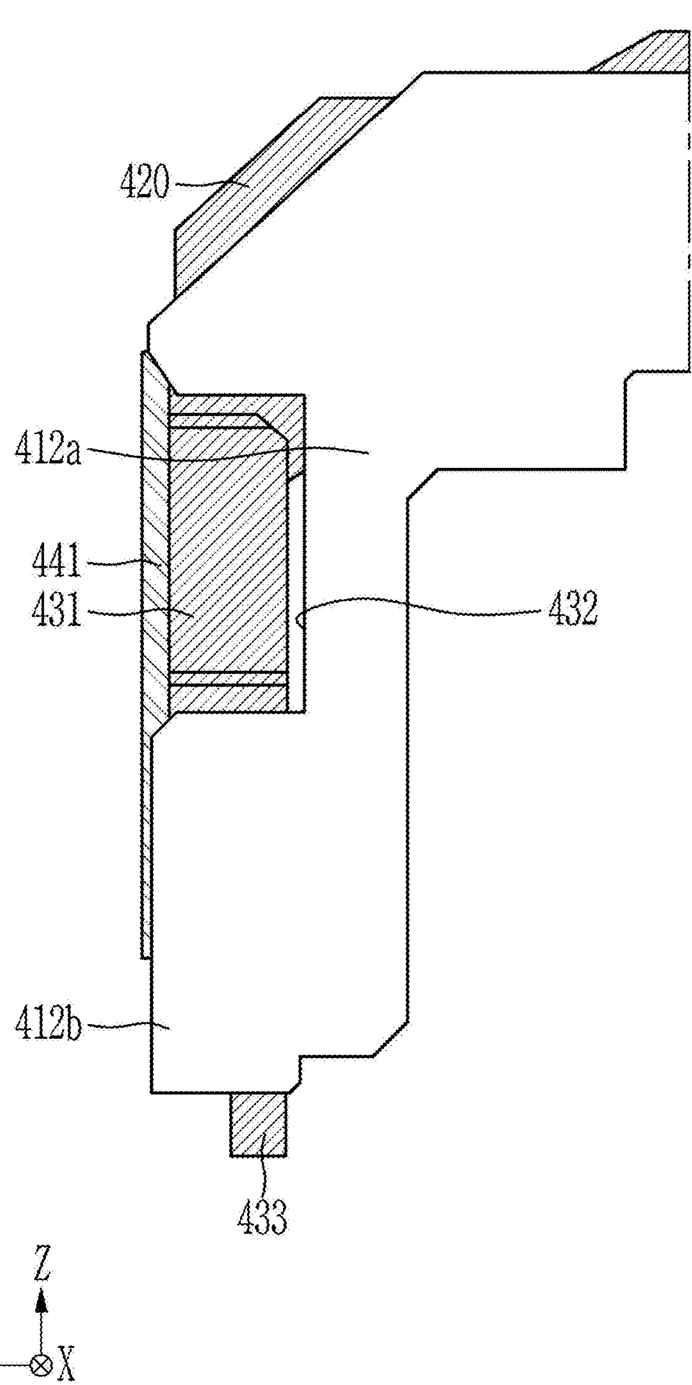
FIG. 5 is an enlarged side surface view of the iris module of FIG. 2.

FIG. 2 is a perspective view of the iris module of FIG. 1, FIG. 3 is an exploded perspective view of FIG. 2, FIG. 4 is a front view of FIG. 2, and FIG. 5 is an enlarged side surface view of the iris module of FIG. 2.

As shown in FIGS. 2 to 4, the iris module 400 includes an iris main body 410, a magnet holder 420, a magnet holder coupling portion 430, an iris driving portion 440, an iris blade 450, a gap spacer 460, and an iris cover 470.

The iris main body 410 may include a base 411 and a holder guide portion 412.

The base 411 may have a roughly cylinder shape with a penetrating hole (or a through hole). The iris blade 450, the gap spacer 460, and the iris cover 470 may be sequentially stacked in the optical axis direction Z on the base 411. The base 411 may be combined with the iris cover 470 to protect the iris blade 450 and the gap spacer 460 inside the base 411 and the iris cover 470 from the outside.

The holder guide portion 412 may be disposed by extending from a side surface of the base 411. The holder guide portion 412 may include a guide main body 412*a* and an edge portion 412*b*.

The guide main body 412*a* may have a quadrangular frame shape extending from the side surface of the base 411 in the optical axis direction Z.

Since the edge portion 412*b* protrudes from an edge of the guide main body 412*a* by a predetermined thickness, it is easy for the magnet holder 420 to be seated. For example, the edge portion 412*b* may protrude from an edge of the guide main body 412*a* in a direction perpendicular to the optical axis direction Z, for example, in the second direction Y. The edge portion 412*b* may guide reciprocal movement of the magnet holder 420 in the first direction X.

The magnet holder 420 may be seated on the holder guide portion 412 of the iris main body 410, and an iris magnet 441 may be installed on the magnet holder 420. An iris ball 421 may be installed between the guide main body 412*a* and the magnet holder 420 to reduce a friction force between the guide main body 412*a* and the magnet holder 420 and to smooth reciprocal movement of the magnet holder 420.

The magnet holder coupling portion 430 may couple the magnet holder 420 to the holder guide portion 412 of the iris main body 410. The magnet holder coupling portion 430 may include a protrusion 431, a fastening portion 432, and a first auxiliary fastening portion 433.

The protrusion 431 may protrude in the first direction X from a side surface of the magnet holder 420.

The fastening portion 432 may be formed at the holder guide portion 412, and may be fastened to the protrusion 431. The fastening portion 432 may be a fastening groove 432 formed at the edge portion 412*b* that corresponds to the protrusion 431.

The first auxiliary fastening portion 433 may extend from a lower surface of the magnet holder 420 in the optical axis direction Z to be inserted into a first fastening hole FH1 formed at the edge portion 412*b*. The first fastening hole FH1 may be formed at the edge portion 412*b* disposed below the iris magnet 441 among the edge portions 412*b*.

By installing the magnet holder coupling portion 430 that couples the magnet holder 420 to the holder guide portion 412 of the iris main body 410, movements of the magnet holder 420 and the iris magnet 441 in the optical axis direction Z due to an external impact, a falling impact, or the like may be restricted. Therefore, an impact applied to the iris module 400 may be alleviated so that a degree of deformation and a degree of damage of the iris module 400 are minimized.

Additionally, by mitigating the impact on the iris module 400, it is possible to withstand a stronger impact, so that reliability of the camera module is secured.

In addition, the magnet holder coupling portion 430 may restrict the movements of the magnet holder 420 and the iris magnet 441 in the optical axis direction Z due to the impact so that the first auxiliary fastening portion 433 is prevented from being separated from the first fastening hole FH1.

Additionally, by limiting the movements of the magnet holder 420 and the iris magnet 441 in the optical axis direction Z due to the impact, the iris ball 421 may be prevented from being separated from the guide main body 412*a*.

On the other hand, the iris driving portion 440 may include the iris magnet 441 and an iris coil 442. The iris driving portion 440 may provide a driving force for adjusting a size of an incident hole by rotating the iris blade 450. The iris magnet 441 may be installed on the magnet holder 420, and the iris coil 442 may be installed on the fourth sidewall 114 of the housing main body 110.

The iris blade 450 may be disposed at an upper portion of the iris main body 410. The iris blade 450 may include a first blade 451 and a second blade 452 that partially overlap each other and rotate and move in opposite directions. The first blade 451 may be disposed at the optical axis and may have a first guide groove 451*a* having an arc shape, and the second blade 452 may be disposed at the optical axis and may have a second guide groove 452*a* having an arc shape. The first guide groove 451*a* and the second guide groove 452*a* may overlap each other to form an incident hole IH. The iris blade 450 may be connected to the magnet holder 420, and may adjust a size of the incident hole by converting a reciprocating linear motion of the magnet holder 420 to a rotational motion.

In the present embodiment, the iris blade 450 overlaps two blades to form the incident hole, but the present disclosure is not limited thereto, and an embodiment in which three or more iris blades overlap to form the incident hole is also possible.

The gap spacer 460 may adjust a maximum size of the incident hole. The gap spacer 460 may be disposed adjacent to the iris blade 450. The gap spacer 460 may have a penetrating hole (or a through hole) PH that is smaller in size than the largest incident hole formed by the iris blade 450 and is larger in size than a middle-sized incident hole. The penetrating hole PH of the gap spacer 460 may be aligned with the incident hole formed by the iris blade 450 in the optical axis direction Z.

The largest incident hole implemented by the iris module 400 of the present embodiment may have a size of the penetrating hole PH of the gap spacer 460. To cope with a situation where a shape of the incident hole does not maintain an intended shape due to a tolerance or the like, the gap spacer 460 is used to set the incident hole with a maximum size.

The iris cover 470 may be disposed at an upper portion of the iris blade 450, and may be fastened to the iris main body 410.

On the other hand, in the embodiment, the fastening portion 432 of the magnet holder coupling portion 430 is the fastening groove formed at the edge portion, but another embodiment in which the fastening portion of the magnet holder coupling portion is a bent portion formed at the edge portion 412*b* is also possible.

Hereinafter, with reference to FIGS. 6 to 10, an iris module and a camera module including the same according to another embodiment of the present disclosure will be described in detail.

Figure 6:
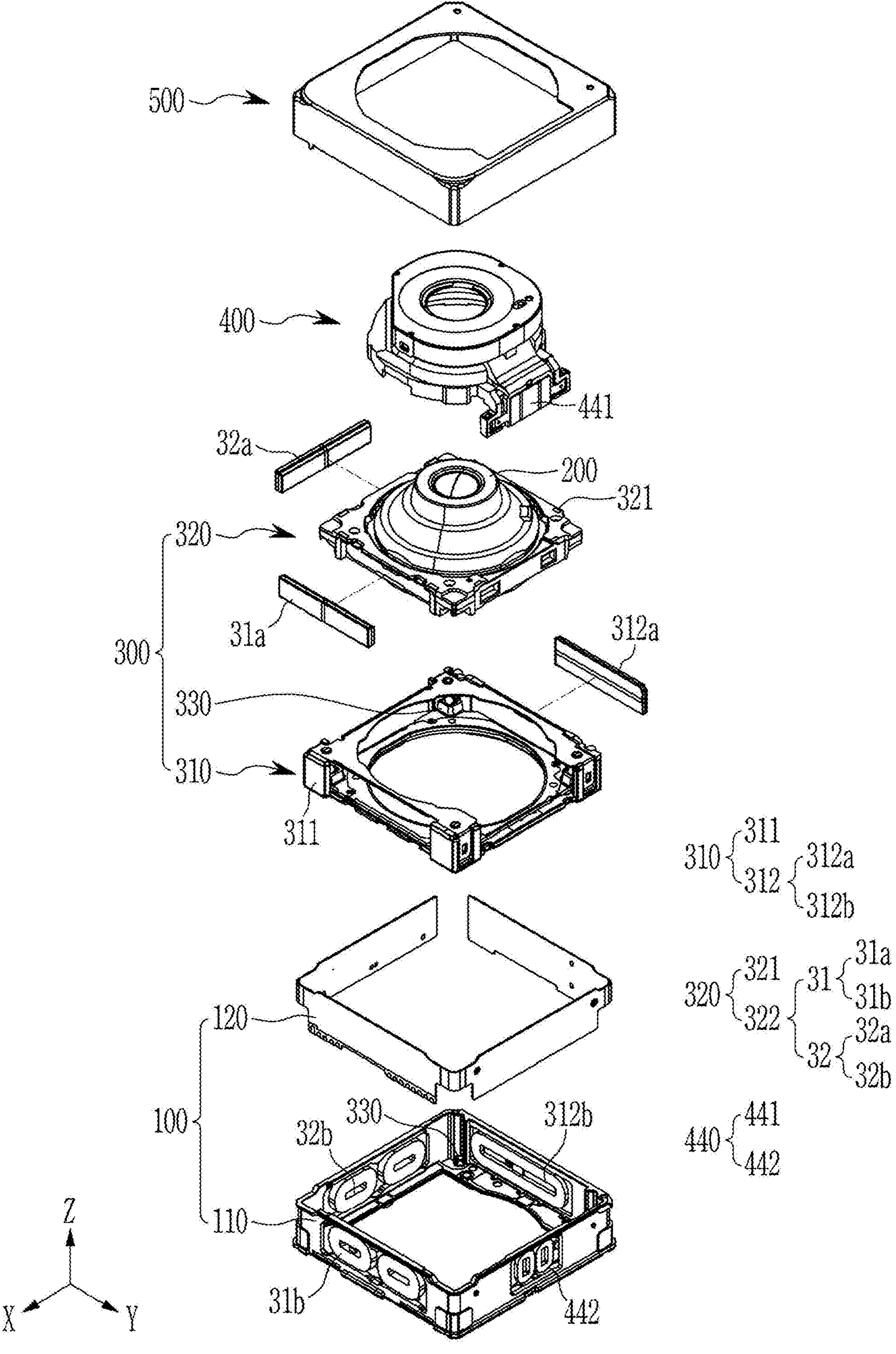
FIG. 6 is an exploded perspective view of a camera module according to another embodiment.
Figure 7:
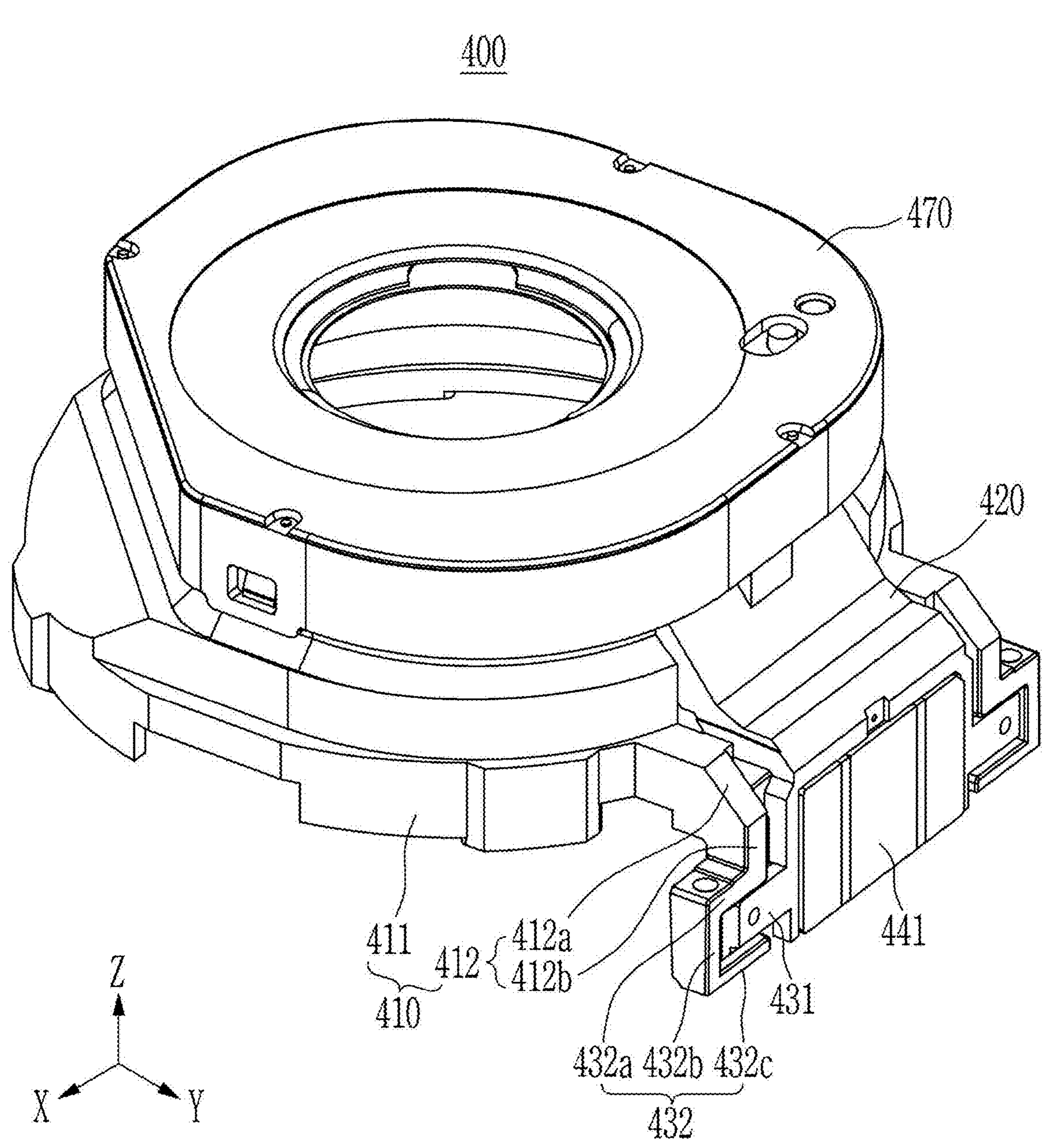
FIG. 7 is a perspective view of an iris module of FIG. 6.
Figure 8:
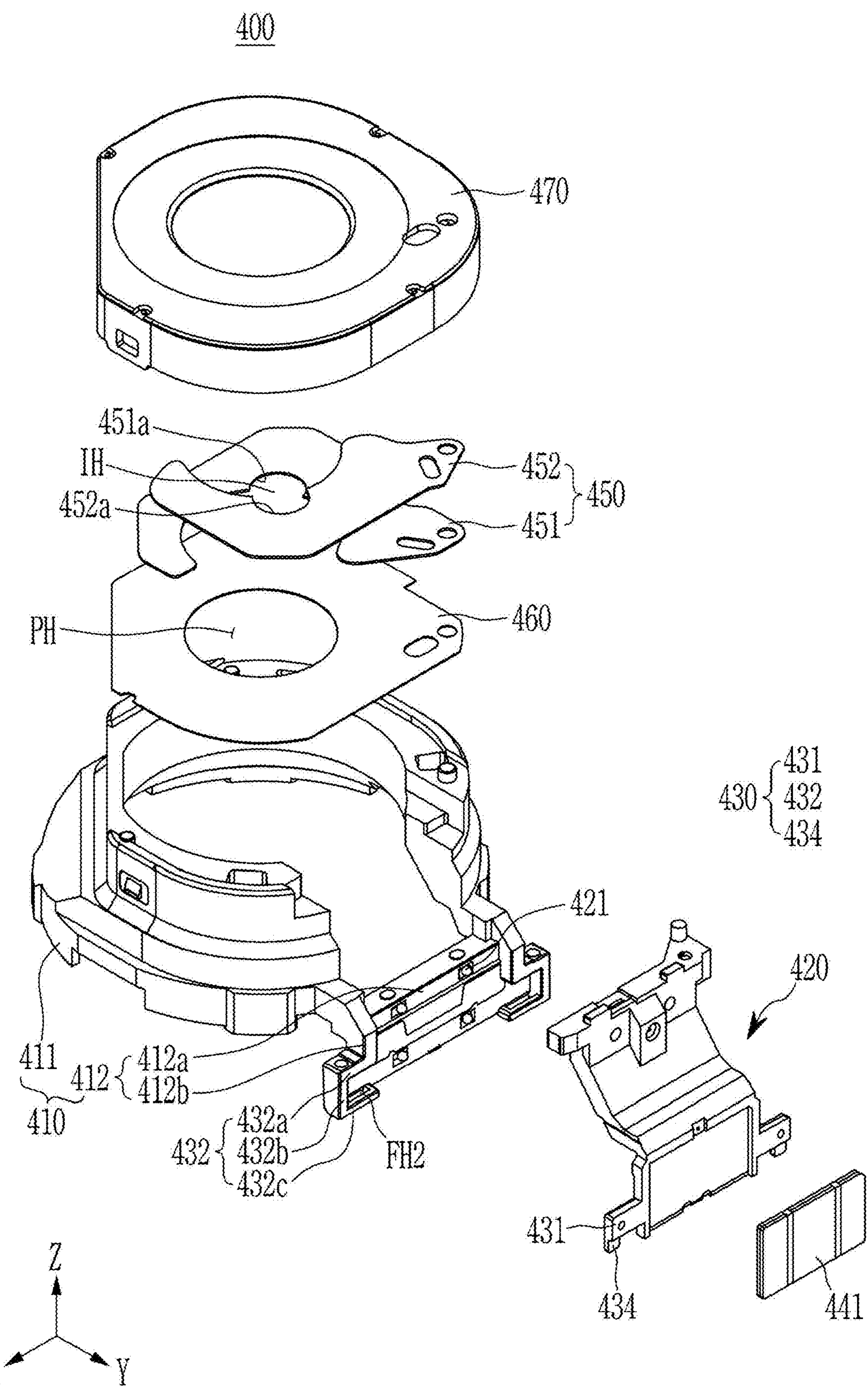
FIG. 8 is an exploded perspective view of FIG. 7.
Figure 9:
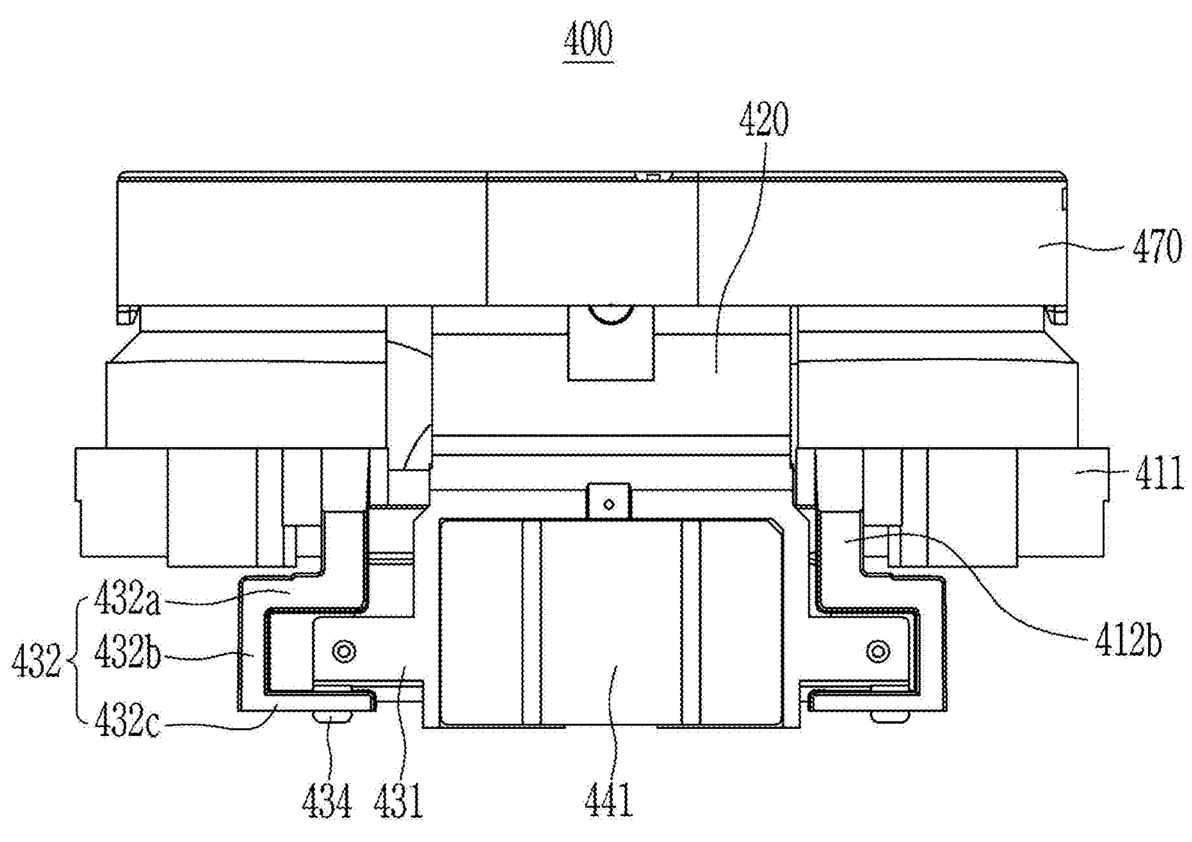
FIG. 9 is a front view of FIG. 7.
Figure 10:
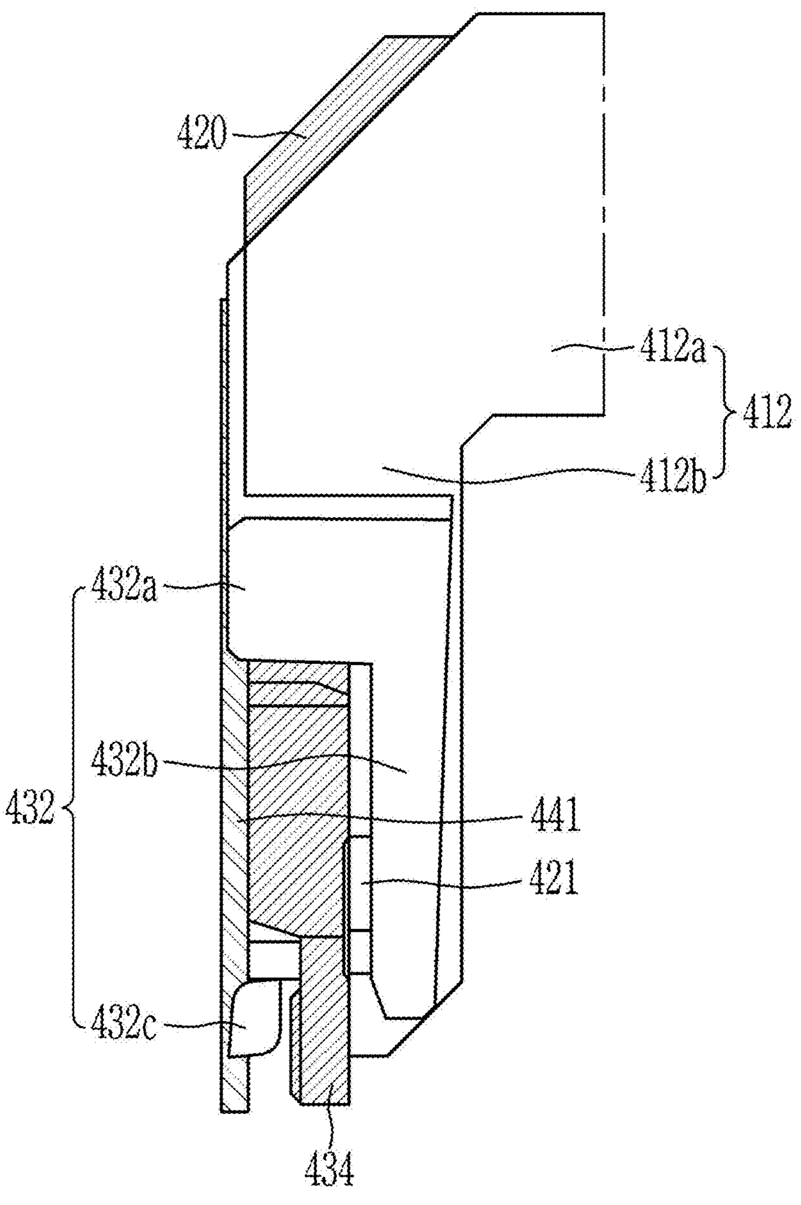
FIG. 10 is an enlarged side surface view of the iris module of FIG. 7.
Figure 10:
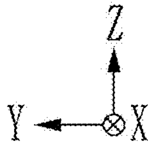

FIG. 6 is an exploded perspective view of the camera module according to the other embodiment, FIG. 7 is a perspective view of an iris module of FIG. 6, FIG. 8 is an exploded perspective view of FIG. 7, FIG. 9 is a front view of FIG. 7, and FIG. 10 is an enlarged side surface view of the iris module of FIG. 7.

The other embodiment shown in FIGS. 6 to 10 is substantially the same as the embodiment shown in FIGS. 1 to 5 except for the structure of the magnet holder coupling portion, so that a repeated description thereof will be omitted.

As illustrated in FIGS. 6 to 10, the camera module according to the other embodiment of the present disclosure includes the housing 100, the lens barrel 200, the lens driving module 300, the iris module 400, and the cover 500.

The iris module 400 includes the iris main body 410, the magnet holder 420, the magnet holder coupling portion 430, the iris driving portion 440, the iris blade 450, the gap spacer 460, and the iris cover 470.

The iris main body 410 may include the base 411 and the holder guide portion 412. The holder guide portion 412 may include the guide main body 412*a* and the edge portion 412*b*. Since the edge portion 412*b* protrudes from the edge of the guide main body 412*a* by a predetermined thickness, it is easy for the magnet holder 420 to be seated. The edge portion 412*b* may guide reciprocal movement of the magnet holder 420 in the first direction X. The edge portion 412*b* may not extend below the iris magnet 441. Therefore, since a size of the iris magnet 441 may be increased, a driving force of the iris driving portion 440 may be improved.

The magnet holder coupling portion 430 may couple the magnet holder 420 to the holder guide portion 412 of the iris main body 410. The magnet holder coupling portion 430 may include the protrusion 431, the fastening portion 432, and a second auxiliary fastening portion 434.

The protrusion 431 may protrude in the first direction X from a side surface of the magnet holder 420.

The fastening portion 432 may include a bent portion 432 formed at the edge portion 412*b* that corresponds to the protrusion 431. The bent portion 432 may include a first branch portion 432*a*, a second branch portion 432*b*, and a third branch portion 432*c* that are connected to each other.

The first branch portion 432*a* may be bent at the edge portion 412*b* to extend parallel to a protruding direction X of the protrusion 431.

The second branch portion 432*b* may be bent at an end portion of the first branch portion 432*a* to extend parallel to the optical axis direction Z. The second branch portion 432*b* may face an end portion of the protrusion 431.

The third branch portion 432*c* may be bent at an end portion of the second branch portion 432*b* to extend parallel to the first branch portion 432*a*.

Accordingly, the protrusion 431 is surrounded by the first branch portion 432*a*, the second branch portion 432*b*, and the third branch portion 432*c*. Therefore, since movement of the protrusion 431 in the optical axis direction Z is restricted by the bent portion 432, movements of the magnet holder 420 and the iris magnet 441 in the optical axis direction Z may be restricted. Therefore, even when an impact is applied to the iris module 400, the movements of the magnet holder 420 and the iris magnet 441 in the optical axis direction Z may be restricted so that the impact is alleviated. Thus, a degree of deformation and a degree of damage of the iris module 400 may be minimized.

Figure 11:
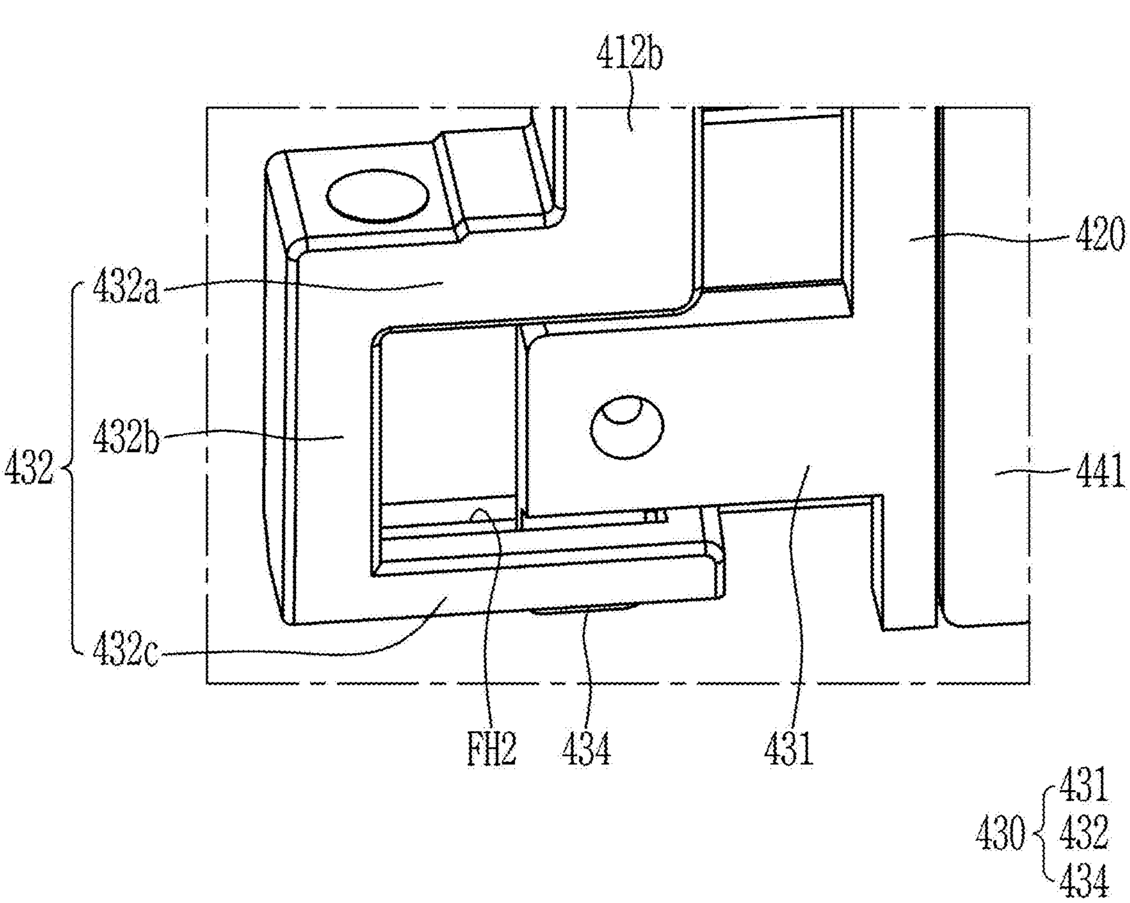
FIG. 11 is a partial enlarged perspective view of the iris module of FIG. 7.

FIG. 11 is a partial enlarged perspective view of the iris module of FIG. 7.

As shown in FIG. 11, the second auxiliary fastening portion 434 may extend parallel to the second branch portion 432*b* from the protrusion 431. The second auxiliary fastening portion 434 may be inserted into a second fastening hole FH2 formed at the third branch portion 432*c*. Since the second fastening hole FH2 extends long along the third branch portion 432*c*, the second fastening hole FH2 may guide reciprocal movement of the protrusion 431 along the first direction X.

The magnet holder coupling portion 430 may restrict movements of the magnet holder 420 and the iris magnet 441 in the optical axis direction Z due to the impact so that the second auxiliary fastening portion 434 is prevented from being separated from the second fastening hole FH2.

Figure 12:
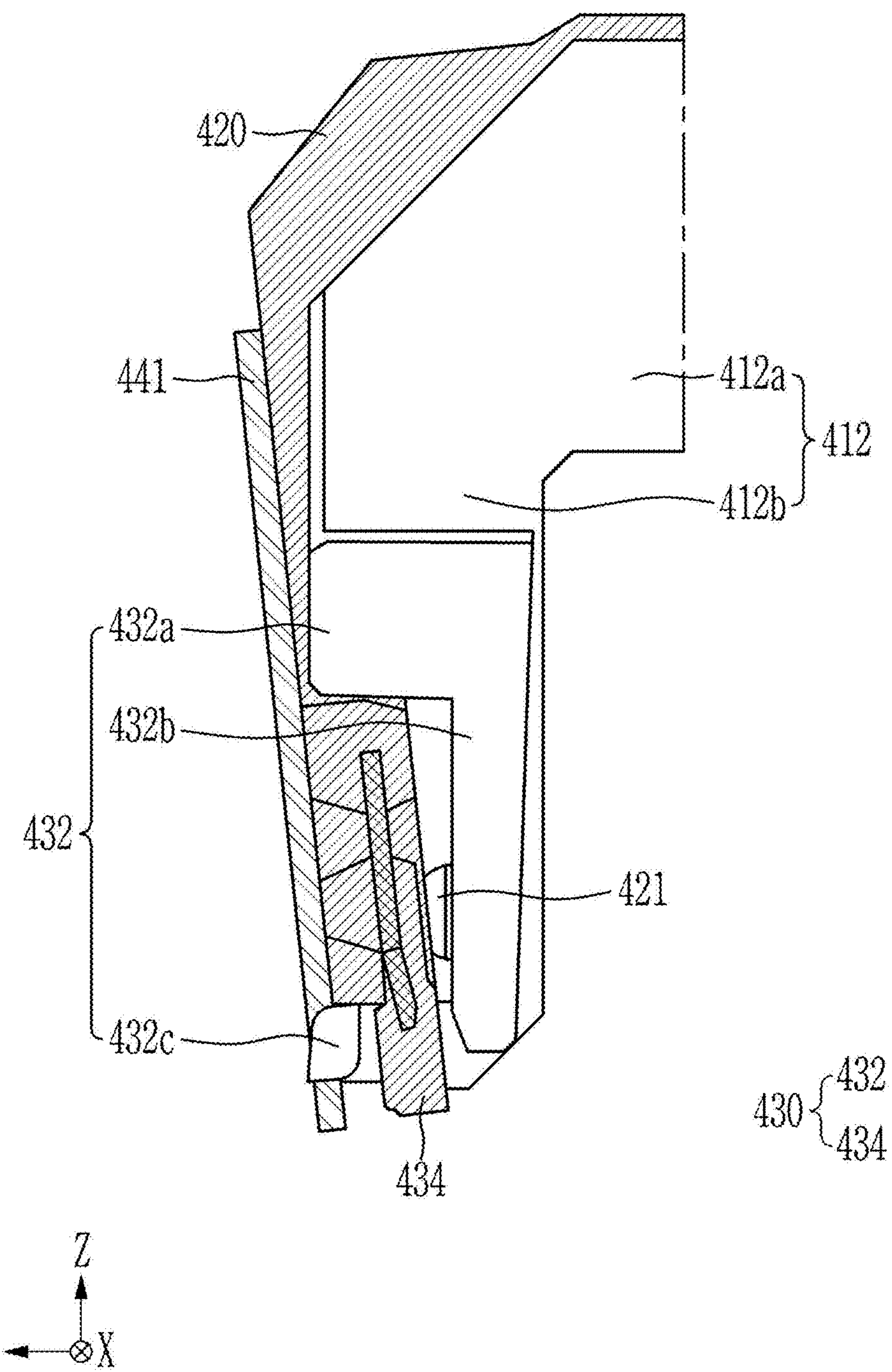
FIG. 12 is an enlarged side surface view of the iris module for describing an operation of a magnet holder coupling portion when an impact is applied to the iris module of FIG. 7.

FIG. 12 is an enlarged side surface view of the iris module for describing an operation of the magnet holder coupling portion when the impact is applied to the iris module of FIG. 7.

As shown in FIG. 12, the magnet holder coupling portion 430 may restrict movements of the magnet holder 420 and the iris magnet 441 in the optical axis direction Z. Thus, even when the impact is applied to the iris module 400, an impact applied to the magnet holder 420 and the iris magnet 441 may be alleviated, so that a degree of deformation and a degree of damage of the iris module 400 are minimized.

In addition, the magnet holder coupling portion 430 may restrict the movements of the magnet holder 420 and the iris magnet 441 in the optical axis direction Z due to the impact so that the iris ball 421 is prevented from being separated from the guide main body 412*a*.

According to the embodiments, movements of a magnet holder and an iris magnet in an optical axis direction may be restricted by an impact such as an external impact, a falling impact, or the like. Therefore, an impact applied to an iris module may be alleviated so that a degree of deformation and a degree of damage of the iris module are minimized.

Additionally, by mitigating the impact on the iris module, it is possible to withstand a stronger impact, so that reliability of a camera module is secured.

Additionally, movements of the magnet holder and the iris magnet in the optical axis direction may be restricted by the impact so that an iris ball is prevented from being separated from a guide main body.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An iris module comprising:

an iris main body comprising a base and a holder guide portion protruding from a side surface of the base with a thickness in a direction perpendicular to an optical axis direction;

a magnet holder seated on the holder guide portion and comprising an iris magnet; and a magnet holder coupling portion that couples the magnet holder to the holder guide portion, wherein the magnet holder coupling portion comprises:

a protrusion protruding from a side surface of the magnet holder; and a fastening portion formed at the holder guide portion and fastened to the protrusion.

2. The iris module of claim 1, wherein the holder guide portion comprises a guide main body having a quadrangular frame shape and an edge portion protruding from an edge of the guide main body to guide reciprocal movement of the magnet holder, and the fastening portion comprises a fastening groove formed at the edge portion that corresponds to the protrusion.

3. The iris module of claim 2, wherein the magnet holder coupling portion further comprises a first auxiliary fastening portion extending from a lower surface of the magnet holder inserted into a first fastening hole formed at the edge portion.

4. The iris module of claim 1, wherein the holder guide portion comprises a guide main body having a quadrangular frame shape and an edge portion protruding from an edge of the guide main body to guide reciprocal movement of the magnet holder, and the fastening portion comprises a bent portion formed at the edge portion that corresponds to the protrusion.

5. The iris module of claim 4, wherein the bent portion comprises a first branch portion extending parallel to a protruding direction of the protrusion, a second branch portion extending by being bent at an end portion of the first branch portion, and a third branch portion bent at an end portion of the second branch portion to extend parallel to the first branch portion, and the protrusion is surrounded by the first branch portion, the second branch portion, and the third branch portion.

6. The iris module of claim 5, wherein the second branch portion faces an end portion of the protrusion.

7. The iris module of claim 5, wherein the magnet holder coupling portion further comprises a second auxiliary fastening portion extending parallel to the second branch portion from the protrusion inserted into a second fastening hole formed at the third branch portion.

8. A camera module comprising:

a housing having an internal space;

a lens barrel accommodated in the internal space of the housing and including a plurality of lenses; and an iris module disposed adjacent to the lens barrel and configured to adjust a size of an incident hole, wherein the iris module comprises:

an iris main body comprising a base and a holder guide portion protruding from a side surface of the base with a thickness in a direction perpendicular to an optical axis direction;

a magnet holder seated on the holder guide portion and comprising an iris magnet, and a magnet holder coupling portion configured to reduce an impact by coupling the magnet holder to the holder guide portion, wherein the magnet holder coupling portion comprises a protrusion protruding from a side surface of the magnet holder and a fastening portion formed at the holder guide portion and fastened to the protrusion.

9. The camera module of claim 8, wherein the holder guide portion comprises a guide main body and an edge portion disposed at an edge of the guide main body, and the fastening portion comprises a fastening groove formed at the edge portion that corresponds to the protrusion.

10. The camera module of claim 9, wherein the magnet holder coupling portion further comprises a first auxiliary fastening portion extending from a lower surface of the magnet holder inserted into a first fastening hole formed at the edge portion.

11. The camera module of claim 8, wherein the holder guide portion comprises a guide main body having a quadrangular frame shape and an edge portion protruding from an edge of the guide main body to guide reciprocal movement of the magnet holder, and the fastening portion comprises a bent portion formed at the edge portion that corresponds to the protrusion.

12. The camera module of claim 11, wherein the bent portion comprises a first branch portion extending parallel to a protruding direction of the protrusion, a second branch portion extending by being bent at an end portion of the first branch portion, and a third branch portion bent at an end portion of the second branch portion to extend parallel to the first branch portion, and the protrusion is surrounded by the first branch portion, the second branch portion, and the third branch portion.

13. The camera module of claim 12, wherein the second branch portion faces an end portion of the protrusion.

14. The camera module of claim 12, wherein the magnet holder coupling portion further comprises a second auxiliary fastening portion extending parallel to the second branch portion from the protrusion inserted into a second fastening hole formed at the third branch portion.

15. The camera module of claim 8, further comprising a lens driving module configured to drive the lens barrel, wherein the lens driving module comprises:

an auto focus portion comprising a focus carrier accommodating the lens barrel, and a focus driving portion configured to generate a driving force to move the focus carrier in an optical axis direction; and an optical image stabilization portion comprising a correction carrier configured to guide movement of the lens barrel, and a correction driving portion configured to generate a driving force to move the correction carrier in a direction perpendicular to the optical axis direction, wherein the correction carrier is disposed inside the focus carrier.

16. The camera module of claim 15, wherein the housing comprises a housing main body including four sidewalls connected to each other to form the internal space, wherein the iris module further comprises an iris driving portion configured to provide a driving force to adjust the size of the incident hole, wherein the iris driving portion comprises an iris magnet and an iris coil that face each other and provide a magnetic force, and the iris coil of the iris driving portion is installed at any one of the four sidewalls of the housing main body.

17. The camera module of claim 16, wherein the focus driving portion is installed at another one of the four sidewalls, and the correction driving portion is installed at the remaining two of the four sidewalls.

* * * * *